(12) United States Patent
Hirose et al.

(10) Patent No.: US 7,624,620 B2
(45) Date of Patent: Dec. 1, 2009

(54) COMBUSTION PRESSURE SENSOR

(75) Inventors: Yoshinobu Hirose, Mie-ken (JP); Takehiro Watarai, Mie-ken (JP)

(73) Assignee: Denso Corporation, Kariya (JP)

(*) Notice: Subject to any disclaimer, the term of this patent is extended or adjusted under 35 U.S.C. 154(b) by 77 days.

(21) Appl. No.: 11/812,679

(22) Filed: Jun. 20, 2007

(65) Prior Publication Data
US 2007/0289370 A1  Dec. 20, 2007

(30) Foreign Application Priority Data
Jun. 20, 2006  (JP) .............................. 2006-169573

(51) Int. Cl.
*G01L 23/22* (2006.01)
(52) U.S. Cl. .................................... 73/35.12
(58) Field of Classification Search ................ 73/35.12, 73/35.13, 116.04; 123/145 A
See application file for complete search history.

(56) References Cited

U.S. PATENT DOCUMENTS

| | | | |
|---|---|---|---|
| 2001/0015402 A1* | 8/2001 | Murai et al. ................. | 248/554 |
| 2005/0061063 A1 | 3/2005 | Haussner et al. .......... | 73/114.18 |
| 2006/0053875 A1 | 3/2006 | Haussner et al. .......... | 73/114.19 |
| 2007/0209624 A1* | 9/2007 | Ludwig et al. ........... | 123/145 A |
| 2008/0264373 A1* | 10/2008 | Boehland et al. ......... | 123/145 A |
| 2008/0302323 A1* | 12/2008 | Kern et al. ............... | 123/145 A |

FOREIGN PATENT DOCUMENTS

| | | |
|---|---|---|
| DE | 33 42 248 | 6/1984 |
| DE | 103 43 521 | 4/2005 |
| DE | 10 2004 044 727 | 3/2006 |
| JP | 59085932 A * | 5/1984 |
| JP | 2005-090954 | 4/2005 |

OTHER PUBLICATIONS

German Office Action dated Oct. 7, 2008, issued in counterpart German Application No. 102007000337.6 with English translation.

* cited by examiner

*Primary Examiner*—Hezron Williams
*Assistant Examiner*—Tamiko D Bellamy
(74) *Attorney, Agent, or Firm*—Nixon & Vanderhye, PC

(57) ABSTRACT

A combustion pressure sensor for detecting a combustion pressure in a combustion chamber of an engine is disclosed as having a housing mounted to an engine head in a gastight structure, a pressure sensor carried on the housing at a base end portion thereof, a transfer member having a pressure-receiving portion exposed to the combustion chamber to be axially slidable in the housing to transfer a combustion pressure from the combustion chamber to the pressure sensor, and a seal member disposed between the pressure-receiving portion of the transfer member and the housing in a gastight sealing structure to block an intrusion of combustion gas from the combustion chamber into the housing. The seal member includes a flexible portion with low rigidity that can stretch and absorb load acting on the pressure sensor when mounting the housing onto an engine cylinder.

12 Claims, 2 Drawing Sheets

COMBUSTION PRESSURE SENSOR

CROSS REFERENCE TO RELATED APPLICATIONS

This application is related to Japanese Patent Application No. 2006-169573, filed on Jun. 20, 2006, the content of which is hereby incorporated by reference.

BACKGROUND OF THE INVENTION

1. Technical Field of the Invention

The present invention relates to combustion pressure sensors for use in internal combustion engines and, more particularly, to a combustion pressure sensor for detecting a combustion pressure in an internal combustion engine such as an automotive diesel engine combined with a glow plug function for preheating an air-fuel mixture.

2. Description of the Related Art

In related art, an attempt has heretofore been made to provide a combustion pressure sensor combined with a glow plug function for a diesel engine, with one exemplary structure being disclosed in Japanese Patent Application Publication No. 2005-90954. With such a structure of the combustion pressure sensor, a glow plug body includes an upper portion for connection to an engine head, and a lower portion exposed to a combustion chamber of a diesel engine. The glow plug body is internally provided with a heating rod, with a film being sandwiched between a lower end of the upper body and the upper area of the lower portion. The film is strongly fixed to between the upper body and the lower portion by laser welding to transfer a heat, developed by the heating rod, to the glow plug body. In addition, the film guarantees a ground connection required for the glow function of a pressure glow plug, while maintaining a gastight sealing effect for the connecting side of the glow plug. In addition, the upper body of the glow plug body has the connecting side whose end face carries thereon a pressure sensor. The pressure sensor is interposed between the glow plug body and a connecting tube under the application of a preliminary pressure.

Further, the engine head is formed with a female-thread and the upper body of the glow plug body has an outer periphery formed with a male-thread. When mounting the combustion pressure sensor onto the engine head, the male-thread of the glow plug body is screwed into the female-thread of the engine head in a gastight sealing effect to bock a leakage of the combustion pressure through a clearance between the outer periphery of the glow plug body and an inner wall of a mounting bore of the engine head. Further, a distal end of the lower portion of the glow plug body is brought into tight contact with a contact surface of the mounting bore of the engine head through the use of a metallic seal member.

With the combustion pressure sensor mounted on the engine head, a combustion pressure arising in a combustion chamber of the diesel engine acts on the heating rod to cause the same to move in an axial direction. This causes the film to move a contact tube toward the upper portion. Such axial movement is transferred to a tension element, thereby releasing the pressure sensor from the preliminary pressure exerted thereto in a preceding stage. Upon releasing of such a preliminary pressure from the pressure sensor, the pressure sensor can detect the combustion pressure to generate an output, which in turn is applied to an electronic circuitry.

With the combustion pressure sensor of the structure set for above, however, when mounting the combustion pressure sensor onto the internal combustion engine, a contraction occurs on the glow plug body in shape along an axial direction thereof. In this moment, such a contraction of the glow plug body causes the heating rod, held in a bonding state with the glow plug body via the film having a rigidity, to move relative to the glow plug body in the axial direction thereof toward the pressure sensor. Upon the occurrence of such an axial movement to transfer a load to the pressure sensor, the pressure sensor is subjected to an undesired load. This results in a deviation in the preliminary pressure exerted to the pressure sensor. This results in a fear of the initially exerted preliminary pressure being deviated, causing an erroneous output different from a correct output to be inevitably generated.

SUMMARY OF THE INVENTION

The present invention has been completed with the above view in mind and has an object to provide a combustion pressure sensor for an internal combustion engine that is effective in highly minimizing a deviation of a preliminary pressure occurring when mounting the combustion pressure sensor to the engine to allow a pressure sensor to generate a correct combustion pressure in a highly reliable manner.

To achieve the above object, a first aspect of the present invention provides a combustion pressure sensor for an engine having an engine head formed with a combustion chamber and a through-bore communicating therewith, the combustion pressure sensor comprising a housing adapted to be mounted to the through-bore of the engine head in a gastight structure and internally having a hollow portion, a transfer member slidably disposed in the hollow portion of the housing and having a pressure-receiving portion exposed to the combustion chamber for receiving a combustion pressure to allow the combustion pressure, received with the pressure-receiving portion, to transfer, a pressure sensor mounted between the housing and the transfer member and exerted with a preliminary pressure for detecting a load resulting from the combustion pressure received with the transfer member, a seal member fixedly disposed between the housing and the transfer member in a gastight relationship to block the combustion pressure prevailing in the combustion chamber from intruding into an inside of the housing. The seal member includes a flexible portion operative to absorb a fluctuation in load actuating on the pressure sensor due to a relative movement of the transfer member caused by a compressive contraction of the housing mounted to the engine head.

With such a structure, when the pressure-receiving portion is subjected to the combustion pressure in the engine, the flexible portion of the seal member stretches to absorb the variation in load acting on the pressure sensor due to the movement of the transfer member caused by the compressive contraction of the housing occurring when the combustion pressure sensor is mounted to the engine head.

With the combustion pressure sensor of the present embodiment, the seal member may include a facing portion facing an outer periphery of the transfer member and extending parallel to an axis thereof, and an orthogonal planar portion extending perpendicular to the facing portion, wherein the flexible portion is formed on the facing portion with a rigidity lower than that of the orthogonal planar portion.

With such a structure, during the occurrence of the compressive contraction of the housing, the transfer member moves to generate the load in the same direction as that in which the flexible portion of the seal member stretches. In addition, the facing portion has rigidity lower than that of the orthogonal planar portion. This enables the facing portion of the seal member to reliably absorb the variation in load acting on the pressure sensor resulting from the movement of the transfer member.

With the combustion pressure sensor of the present embodiment, the flexible portion may be preferably formed in a corrugated shape.

With such a structure, forming the flexible portion in the corrugated shape enables a reduction in rigidity of the seal member while increasing a length of the flexible portion. This enables the flexible portion of the seal member to more reliably absorb the load acting on the pressure sensor caused by the movement of the transfer member.

With the combustion pressure sensor of the present embodiment, the seal member may preferably include a facing portion facing an outer periphery of the transfer member and extending parallel to an axis thereof, and an orthogonal planar portion extending perpendicular to the facing portion, wherein the flexible portion is formed on the orthogonal planar portion and the orthogonal planar portion has a rigidity lower than that of facing portion.

With such a structure, the flexible portion with low rigidity can reliably absorb the load acting on the pressure sensor resulting from the movement of the transfer member due to the compressive contraction of the housing. In addition, the orthogonal planar portion of the seal member plays a role as a part required for the housing and the transfer member to be connected to each other, that is, an inevitable part. Forming the flexible portion in such a part enables the seal member to be formed in a reduced body size.

With the combustion pressure sensor of the present embodiment, the flexible portion may be preferably formed in a corrugated shape.

With such a structure, forming the flexible portion in the corrugated shape enables a reduction in rigidity of the seal member. This enables the flexible portion of the seal member to more reliably absorb the adverse affect acting on the pressure sensor caused by the movement of the transfer member.

With the combustion pressure sensor of the present embodiment, the transfer member may further preferably include a heating element disposed inside the pressure-receiving portion for preheating an air-fuel mixture in the combustion chamber, and a wire lead for supplying electric power to the heating element.

With such a structure, the transfer member incorporating the heating element disposed inside the pressure-receiving portion, the combustion pressure sensor has a glow plug function to be suitable as a combustion pressure sensor for a diesel engine.

DETAILED DESCRIPTION OF PREFERRED EMBODIMENTS

Now, combustion pressure sensors of various embodiments according to the present invention are described below in detail with reference to the accompanying drawings. However, the present invention is construed not to be limited to such embodiments described below and technical concepts of the present invention may be implemented in combination with other known technologies or the other technology having functions equivalent to such known technologies.

First Embodiment

Now, a combustion pressure sensor 10 of an embodiment according to the present invention is described below in detail with reference to FIG. 1.

Figure 1:
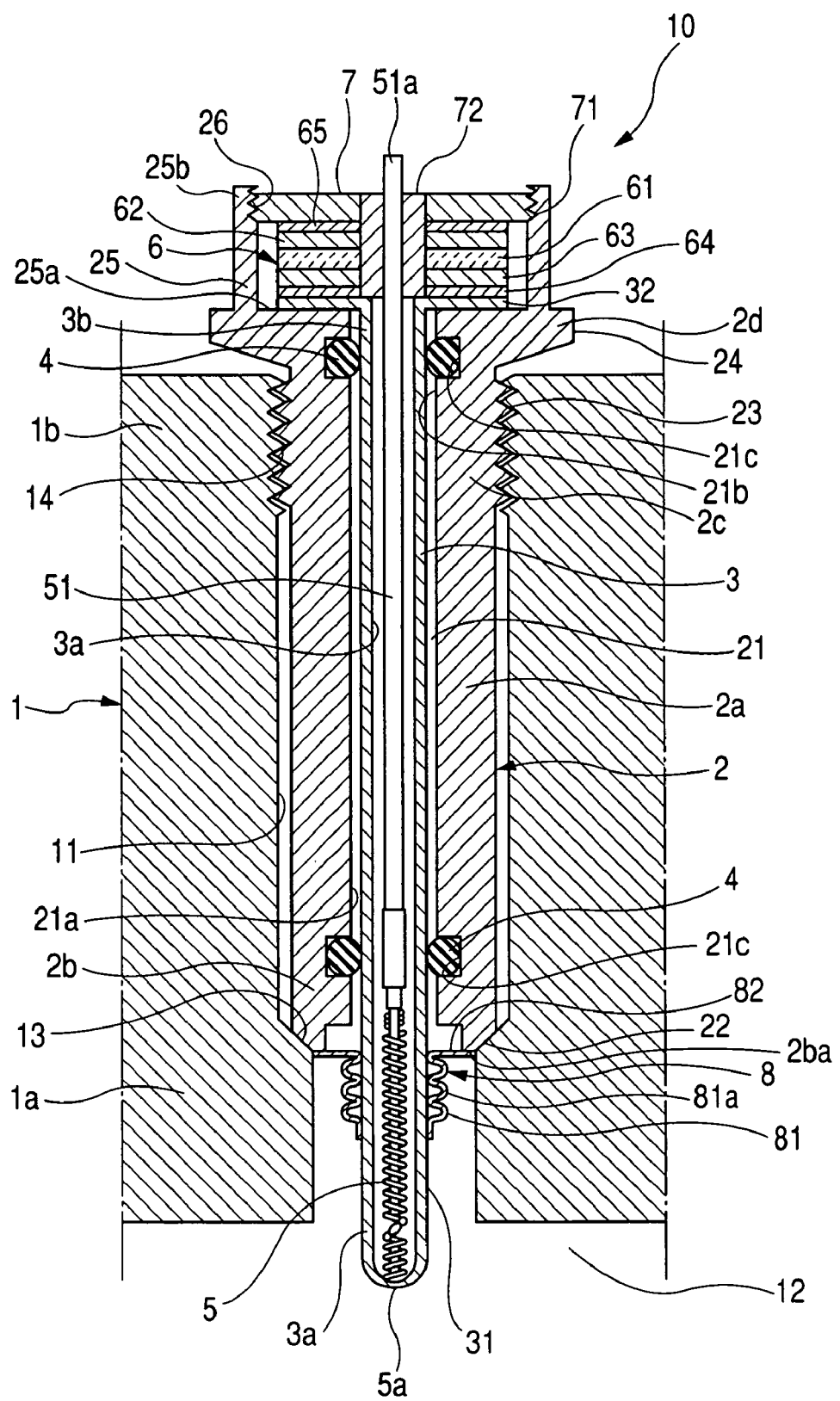
FIG. 1 is a longitudinal cross sectional view showing a combustion pressure sensor of a first embodiment according to the present invention under a status installed on an engine head of an engine.

FIG. 1 is a longitudinal cross sectional view showing the combustion pressure sensor 10 of the present embodiment under a state mounted on an engine head 1 of a diesel engine.

As shown in FIG. 1, the engine head 1 is formed with a through-bore 11 in fluid communication with a combustion chamber 12 of the diesel engine. The through-bore 11 has an inward area 1a, formed with an annular tapered shoulder 13 in the form of a stepped portion, and an outward 1b formed with a female-threaded portion 14.

Hereunder, a structure of the combustion pressure sensor 10 is described below in detail with reference to FIG. 1.

The combustion pressure sensor 10 includes a metallic housing 2 disposed in the through-bore 11 of the engine head 1. The housing 2 includes a substantially cylindrical housing body 2a in which an axially extending hollow portion 21 is internally formed. The housing body 2a has a leading end 2b formed with a tapered annular shoulder 22, held in tight contact with the tapered annular shoulder 13 of the engine head 1, and a base end 2c placed in opposition to the combustion chamber 12 and having an outer periphery formed with a male-threaded portion 23 in screwing engagement with the female-threaded portion 14 of the engine head 1.

With the male-threaded portion 23 of the housing body 2a held in screwing engagement with the female-threaded portion 14 when the combustion pressure sensor 10 is mounted onto the engine head 1, an axial force acts on the housing 2 and the engine head 1. This causes the tapered portion 22 of the housing body 2a and the tapered portion 13 of the engine head 1 to be brought into strongly tight contact with each other to provides a metallic sealing effect.

With the male-threaded portion 23 and the female-threaded portion 14 held in screwing engagement with each other while the tapered shoulder 22 of the housing body 2a is held in tight contact with the tapered shoulder 13 of the engine body 1, a gastight structure is provided between the housing 2 of the combustion pressure sensor 10 and the engine head 1. This blocks a leakage of combustion gas from a clearance between an inner periphery of the through-bore 11 of the engine head 1 and an outer periphery of the housing 2.

The housing body 2a has an external base end portion 2d, placed in opposition to the combustion chamber 12, which is formed with a hexagonal portion 24 to allow a mounting tool (not shown) to be fitted for mounting the combustion pressure sensor 10 to the engine head 1 in an easy fashion. The external base end portion 2d has an axially extending cylindrical mounting section 25 for encompassing a pressure sensor 6 that will be described later in detail.

The hollow portion 21 of the cylindrical body 2a has a leading end portion 21a and a base end portion 21b formed with annular recesses 21c in which O-rings 4 are accommodated. The O-rings 4 slidably support a hollow transfer member 3, made of heat resistant material such as stainless steel and having a hollow portion 3a. The transfer member 3 axially extends through the hollow portion 21 of the housing body 2a in a concentric relation to the housing 2 to be axially slidable within the housing 2.

The transfer member 3 has a bottomed leading end portion 3a exposed to the combustion chamber 12 to play a role as a pressure-receiving portion 31. The transfer member 3 has a base end portion 3b formed with a radially extending disc-like annular flange 32 held in contact with a bottom surface 25a of the cylindrical mounting section 25.

Further, the transfer member 3 accommodates therein a heating element 5 which is disposed in the pressure-receiving portion 31. The heating element 5, made of heating material such as a nickel chrome wire or the like, has a base end electrically connected to a lead wire 51. The lead wire 51 axially extends through the hollow portion 3a of the hollow transfer member 3. The lead wire 51 supplies the heating element 5 with electric power to cause the heating element 5 to develop a heat for warming up an air-fuel mixture in the combustion chamber 12 during startup of the diesel engine, thereby performing a glow plug function. The heating element 5 has a leading end 5a fixed to an inner bottom of the pressure-receiving portion 31 of the transfer member 3 by welding.

The pressure sensor 6 serves to detect a microscopic displacement of the transfer member 3 resulting from the combustion pressure in the combustion chamber 12. To this end, the pressure sensor 6 is disposed in the mounting section 25 of the housing 2, with a preliminary pressure being exerted to between the housing 2 and the transfer member 3. For instance, the pressure sensor 6 includes a space collar 72 through which a trailing end of a base end portion 51a of the lead wire 51 axially extends, a piezoelectric element 61 carried on the space collar 72 and disposed in the mounting section 25, a pair of positive and negative electrodes 62, 63 carried on the space collar 72 so as to sandwich the piezoelectric element 61 in the mounting section 25, and a pair of outermost insulators 64, 65 carried on the space collar 72 and disposed in the mounting section 25 on both sides of the electrodes 63, 62, respectively.

A pressure-exerting member 7 is fixedly secured to the spacer collar 72 and has an outer periphery formed with a male-thread 71. The male-thread 71 of the pressure-exerting member 7 is screwed into a female-thread 26 formed on an inner periphery of a base end 25b of the mounting section 25 to be placed in a fixed place under a preliminary pressure exerted to between the housing 2 and the transfer member 3.

With such a screwing engagement between the male-thread 71 and the female-thread 26, the pressure-exerting member 7 allows the insulator 65, the electrode 62, the piezoelectric element ceramic element 61, the electrode 64, the insulator 64 and the annular flange 32 of the transfer member 3 to be forced into pressured contact with the bottom surface 25a of the mounting section 25 to apply the preliminary pressure against the piezoelectric element ceramic element 61. This is because the preliminary pressure, applied to the piezoelectric element ceramic element 61, blocks a fine clearance from being created between the pressure-exerting member 7 and the bottom surface 25a of the mounting section 25 while ensuring a load, resulting from a combustion pressure acting on the pressure-receiving portion 31 of the transfer member 3, to be directly transferred through the transfer member 3 to the piezoelectric element ceramic element 61.

Moreover, the insulation spacer collar 72 axially extends through the piezoelectric element ceramic element 61, the electrodes 62, 64 and the insulators 64, 65 such that these component parts are concentrically aligned with each other at a center position, while providing electrical insulation relative to the wire lead 51.

A seal member 8, made of metal such as stainless steel or the like, has one end, fixedly attached to a leading end face 2ba of the housing 2 by laser welding, and the other end fixedly attached to an outer periphery of the pressure-receiving portion 31 of the hollow transfer member 3 by laser welding. Thus, the seal member 8 provides a hermetic sealing effect between the combustion chamber 12 and the inside of the combustion pressure sensor 10. Therefore, no combustion gas intrudes from the combustion chamber 12 into the hollow portion 21 of the housing, while making it possible to slide the transfer member 3 in an axial direction.

The seal member 8 includes a facing portion 81, extending along the outer periphery of the pressure-receiving portion 31 of the transfer member 3 in an axial direction thereof, and an orthogonal planar portion 82 formed in an alular flange shape and extending perpendicular to the axis of the facing portion 81. The facing portion 81 is composed of a flexible portion 81a with reduced rigidity in the form of a corrugated shape in cross section.

Although not shown in the drawing figure, the flexible portion 81a has plural valleys whose inner peripheries are out of contact with the outer periphery of the transfer member 3 with a slight amount of clearance being kept between the inner periphery of the valley of the corrugated portion 81a and the outer periphery of the transfer member 3. With the flexible portion 81a extending along the axial direction of the transfer member 3 and having low rigidity, the flexible portion 81a can move in the same axial direction as that in which the transfer member 3 moves. This allows the flexible portion 81a to axially stretch with the axial movement of the transfer member 3 for thereby absorbing the load variation acting on the pressure sensor occurring when the combustion pressure sensor 10 is mounted to the engine head 1.

With such a structure of the present embodiment set forth above, the combustion pressure sensor 10 is mounted onto the engine head 1 of the diesel engine under a preliminary pressure being exerted to the pressure sensor 6. When screwing and tightening the housing 2 to the engine head 1, a compression force is exerted to between the tapered portion 22 of the housing 2, formed at the distal end 2b thereof, and the male-threaded portion 23 formed at the base end 2c of the housing 2. This causes the metal housing 2 to be axially contracted toward the combustion chamber 12. Thus, the pressure sensor 6 and the transfer member 3 also unitarily move toward the combustion chamber 12.

The seal member 8 is fixedly secured to both the housing 2 and the transfer member 3 and composed of the flexible portion 81a with low rigidity. This allows the flexible portion 81a to be axially extendable toward the combustion chamber 12 in a deformed state in response to the axial movement of the transfer member 3 toward the combustion chamber 12. Thus, the flexible portion 81a is available to stretch with the movement of the transfer member 3 toward the combustion chamber 12 in the axial direction. This allows the transfer member 3 to move toward the combustion chamber 12 during a phase of mounting the housing 2 onto the engine head 1.

Accordingly, the flexible portion 81a absorbs an adverse affect resulting from the contraction of the housing 2 caused when the housing 3 is tightened to the engine head 1 with a strong force. That is, the flexible portion 81a absorbs a load that would act on the pressure sensor 6 due to the axial movement of the transfer member 3 toward the combustion chamber 12 resulting from the compressive contraction of the housing 2 when mounted to the engine head 1. Thus, almost no load is transferred to the pressure sensor 6, thereby achieving remarkable reduction in the fluctuation (under pressure) of the preliminary pressure exerted to the pressure sensor 6. Thus, the combustion pressure sensor 10 can generate an output signal with high precision.

In addition, the seal member 8 has the facing portion 81 composed of the flexible portion 81a formed in a corrugated structure extending along an outer periphery of the transfer member 3 to easily stretch with the axial movement of the transfer member 8. Therefore, even if a load acts on the pressure sensor 6 due to the axial movement of the transfer member 3 caused relative to the pressure sensor 6 when the housing 2 bears the compressive contraction during a phase of mounting the combustion pressure sensor 10 to the engine head 1, the corrugated configuration of the flexible portion 81 can stretch to allow the seal member 8 to absorb such load. This remarkably reduces an undesired load (compressive pressure) applied to the pressure sensor 6 in excess, making it possible to allow the pressure sensor 6 to detect an output with high precision.

With the combustion pressure sensor 10 of the present embodiment, the transfer member 3 internally accommodates the heating coil 5 and the wire lead 51 through which electric power is supplied to the heating element 5. This allows electric current to flow through the wire lead 51 to the heating oil 5, the pressure-receiving portion 31 of the transfer member 3, the seal member 8, the housing 2 and the engine head 1. Thus, the heating coil 5 is heated up, making it possible to warm up the combustion chamber 12 of the engine operating at low temperatures in a cold season or the like.

Figure 2:
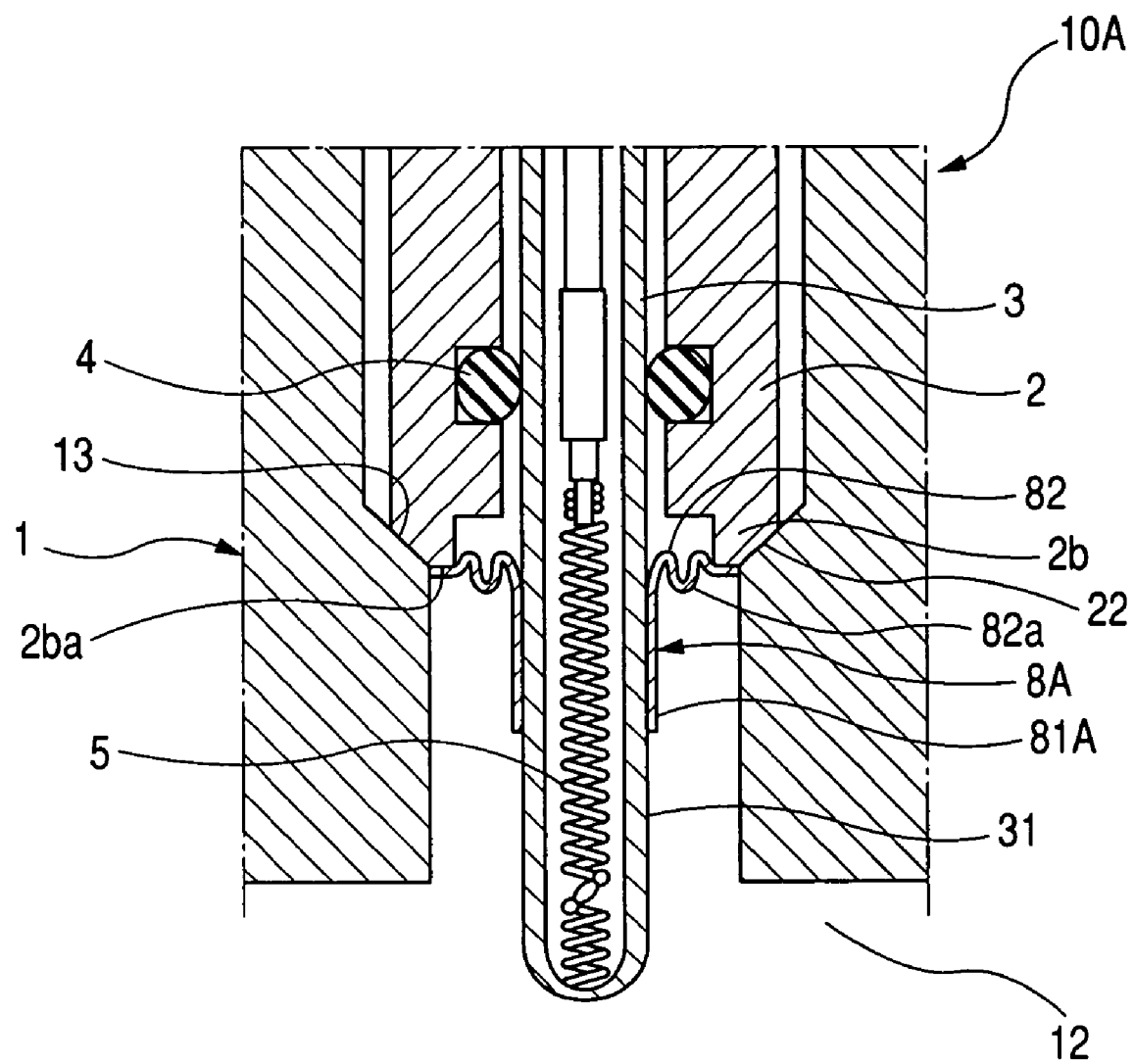
FIG. 2 is a cross sectional view showing an essential part of a combustion pressure sensor of a second embodiment according to the present invention under a status installed on the engine head of the engine.

FIG. 2 is a fragmentary longitudinal cross sectional view showing an essential part of a combustion pressure sensor 10A of a second embodiment according to the present invention, with the combustion pressure sensor 10A being mounted on the engine head 1.

The combustion pressure sensor 10A of the second embodiment differs from the combustion pressure sensor 10 of the first embodiment only in respect of a seal member 8A. Thus, the same component parts of the combustion pressure sensor 10A of the present embodiment as those of the first embodiment bear like reference numerals and a description will be given with a focus on differing points.

With the combustion pressure sensor 10A of the second embodiment, the seal member 8A includes a cylindrical sleeve portion 81A, fixedly attached to the outer periphery of the pressure-receiving portion 31 of the transfer member 3 by laser welding, and an orthogonal planar portion 82 including a flexible portion 82a in the form of a corrugated structure that is fixedly attached to the end face 2b of the housing 2. The flexible portion 82a has low rigidity and operates in the same manner as the flexible portion 81a of the seal member 8 of the first embodiment.

With the combustion pressure sensor 10A of the second embodiment, the seal member 8A has the orthogonal portion 82 composed of the flexible portion 82a. Even with such a structure, the flexible portion 82a is operative to stretch for thereby absorbing a load acting on the pressure sensor 6 caused by the movement of the transfer member 3 caused relative to the pressure sensor 6 due to the compressive contraction of the housing 2 caused when mounting the housing 2 to the engine head 1. This result in a remarkable reduction in the fluctuation of the preliminary pressure exerted to the pressure sensor 6, enabling the combustion pressure sensor 10A to detect an output of the combustion pressure with high precision. Further, the orthogonal portion 82 serves as an essential part of the seal member 8A. Thus, the orthogonal portion 82 can be composed of the flexible portion 82a without causing the orthogonal portion 82 to increase in size of the seal member 8A in an orthogonal direction. In addition, with the orthogonal portion 82 formed with the flexible portion 82a with low rigidity, the flexible structure 82a can be deformed in an increased extent.

Therefore, even if the load acts on the pressure sensor 6 due to the axial movement of the transfer member 3 caused relative to the pressure sensor 6 due to the compressive contraction of the housing 2 when mounted to the engine head 1, the corrugated structure of the flexible portion 82a can easily stretch to allow the seal member 8A to absorb such load. This remarkably reduces an undesired load (compressive pressure) being applied to the pressure sensor 6 in excess, making it possible to allow the pressure sensor 6 to detect an output with high precision.

The combustion pressure sensors 10, 10A of the first and second embodiments are exemplified in structures with the seal members 8, 8A fixedly secured to the leading end portions 2b of the housings 2. Thus, the combustion pressure sensors 8, 8A, each having the seal member fixed to the housing 2, are implemented in such exemplified structures where the transfer member 3 has the greatest compressive contraction when mounting the housings 2 to the engine cylinder 1.

However, the present invention is not limited to such particular structures and may be implemented in various modes. For instance, the present invention may be applied to a combustion pressure sensor such that the seal member is fixedly secured to another position (such as an intermediate position) of the housing 2 with a similar advantage being obtained. In addition, the flexible portions 81a, 82a of the seal members 8, 8A have been described with reference to the structures as applied to the facing portion 81 in the first embodiment and the orthogonal portion 82 in the second embodiment. However, both of the facing portion 81 and the orthogonal portion 82 may include the flexible portions if desired.

While the specific embodiments of the present invention have been described in detail, the present invention is not limited to the particularly illustrated structures of the gas sensors of the various embodiment set forth above provided that the measuring gas side covers achieve the task of the present invention. It will be appreciated by those skilled in the art that various modifications and alternatives to those details could be developed in light of the overall teachings of the disclosure.

What is claimed is:

1. A combustion pressure sensor for an engine having an engine head formed with a combustion chamber and a through-bore communicating therewith, the combustion pressure sensor comprising:

a housing adapted to be mounted to the through-bore of the engine head in a gastight structure and internally having a hollow portion;

a transfer member slidably disposed in the hollow portion of the housing and having a pressure-receiving portion exposed to the combustion chamber for receiving a combustion pressure to allow the combustion pressure, received with the pressure-receiving portion, to transfer;

a pressure sensor mounted between the housing and the transfer member and exerted with a preliminary pressure for detecting a load resulting from the combustion pressure received with the transfer member; and a seal member fixedly disposed between the housing and the transfer member in a gastight relationship to block the combustion pressure prevailing in the combustion chamber from intruding into an inside of the housing;

wherein the seal member includes a flexible portion operative to absorb a fluctuation in load actuating on the pressure sensor due to a relative movement of the transfer member caused by a compressive contraction of the housing mounted to the engine head, wherein the seal member includes a facing portion facing an outer periphery of the transfer member and extending parallel to an axis thereof, and an orthogonal planar portion extending perpendicular to the facing portion; and wherein the flexible portion is formed on the facing portion with a rigidity lower than that of the orthogonal planar portion.

2. The combustion pressure sensor for an engine according to claim 1, wherein:
the flexible portion is formed in a corrugated shape.

3. A combustion pressure sensor for an engine having an engine head formed with a combustion chamber and a through-bore communicating therewith, the combustion pressure sensor comprising:
a housing adapted to be mounted to the through-bore of the engine head in a gastight structure and internally having a hollow portion;
a transfer member slidably disposed in the hollow portion of the housing and having a pressure-receiving portion exposed to the combustion chamber for receiving a combustion pressure to allow the combustion pressure, received with the pressure-receiving portion, to transfer;
a pressure sensor mounted between the housing and the transfer member and exerted with a preliminary pressure for detecting a load resulting from the combustion pressure received with the transfer member; and
a seal member fixedly disposed between the housing and the transfer member in a gastight relationship to block the combustion pressure prevailing in the combustion chamber from intruding into an inside of the housing;
wherein the seal member includes a flexible portion operative to absorb a fluctuation in load actuating on the pressure sensor due to a relative movement of the transfer member caused by a compressive contraction of the housing mounted to the engine head;
wherein the seal member includes a facing portion facing an outer periphery of the transfer member and extending parallel to an axis thereof, and an orthogonal planar portion extending perpendicular to the facing portion; and
wherein the flexible portion is formed on the orthogonal planar portion and the orthogonal planar portion has a rigidity lower than that of facing portion.

4. The combustion pressure sensor for an engine according to claim 3, wherein:
the flexible portion is formed in a corrugated shape.

5. The combustion pressure sensor for an engine according to claim 1, wherein:
the transfer member further includes a heating element disposed inside the pressure-receiving portion for preheating an air-fuel mixture in the combustion chamber, and a wire lead for supplying electric power to the heating element.

6. The combustion pressure sensor for an engine according to claim 1, wherein:
the housing includes a housing body having a base end formed with a mounting section for encompassing the pressure sensor.

7. The combustion pressure sensor for an engine according to claim 6, wherein:
the pressure sensor includes a piezoelectric element disposed in the mounting section of the housing body, a pair of positive and negative electrodes disposed in the mounting section of the housing body so as to sandwich the piezoelectric element, and a pressure exerting member fixedly supported with the mounting section of the housing body and connected to the transfer member to transfer the combustion pressure to the piezoelectric element.

8. The combustion pressure sensor for an engine according to claim 7, wherein:
the pressure sensor further includes a space collar axially extending through the pair of positive and negative electrodes and the piezoelectric element and fixedly connected to the pressure exerting member.

9. The combustion pressure sensor for an engine according to claim 1, wherein:
the through-bore of the engine head is substantially cylindrical in cross section and has a leading end formed with an annular tapered shoulder; and
the housing includes a substantially cylindrical housing body having a leading end formed with a tapered annular shoulder adapted to be held in tight contact with the tapered annular shoulder of the engine head.

10. A combustion pressure sensor for an engine having an engine head formed with a combustion chamber and a through-bore communicating therewith, the combustion pressure sensor comprising:
a housing adapted to be mounted to the through-bore of the engine head in a gastight structure and internally having a hollow portion;
a transfer member slidably disposed in the hollow portion of the housing and having a pressure-receiving portion exposed to the combustion chamber for receiving a combustion pressure to allow the combustion pressure, received with the pressure-receiving portion, to transfer;
a pressure sensor mounted between the housing and the transfer member and exerted with a preliminary pressure for detecting a load resulting from the combustion pressure received with the transfer member; and
a seal member fixedly disposed between the housing and the transfer member in a gastight relationship to block the combustion pressure prevailing in the combustion chamber from intruding into an inside of the housing;
wherein the seal member includes a flexible portion operative to absorb a fluctuation in load actuating on the pressure sensor due to a relative movement of the transfer member caused by a compressive contraction of the housing mounted to the engine head;
wherein the housing body has a leading end face, placed in close proximity to the tapered annular shoulder of the cylindrical housing body;
wherein the seal member includes a corrugated flexible portion, having one end connected to the pressure-receiving portion of the transfer member, and an orthogonal planar portion connected to the other end of the corrugated flexible portion and fixedly secured to the leading end face of the housing body; and
wherein the corrugated flexible portion has low rigidity than that of the orthogonal planar portion.

11. A combustion pressure sensor for an engine having an engine head formed with a combustion chamber and a through-bore communicating therewith, the combustion pressure sensor comprising:
a housing adapted to be mounted to the through-bore of the engine head in a gastight structure and internally having a hollow portion;
a transfer member slidably disposed in the hollow portion of the housing and having a pressure-receiving portion exposed to the combustion chamber for receiving a combustion pressure to allow the combustion pressure, received with the pressure-receiving portion, to transfer;

a pressure sensor mounted between the housing and the transfer member and exerted with a preliminary pressure for detecting a load resulting from the combustion pressure received with the transfer member; and a seal member fixedly disposed between the housing and the transfer member in a gastight relationship to block the combustion pressure prevailing in the combustion chamber from intruding into an inside of the housing;

wherein the seal member includes a flexible portion operative to absorb a fluctuation in load actuating on the pressure sensor due to a relative movement of the transfer member caused by a compressive contraction of the housing mounted to the engine head;

wherein the housing body has a leading end face, placed in close proximity to the tapered annular shoulder of the cylindrical housing body;

wherein the seal member includes a cylindrical sleeve portion, fixedly attached to an outer periphery of the pressure-receiving portion of the transfer member, and a corrugated orthogonal planar portion fixedly attached to the leading end face of the housing body; and wherein the corrugated orthogonal planar portion has low rigidity than that of the cylindrical sleeve portion.

12. The combustion pressure sensor for an engine according to claim 8, wherein:

the transfer member further includes a heating element disposed inside the pressure-receiving portion for preheating an air-fuel mixture in the combustion chamber, and a wire lead for supplying electric power to the heating element; and wherein the wire lead extends through the space collar and held in a gastight relationship.

* * * * *